(12) United States Patent
Koshimizu et al.

(10) Patent No.: US 8,443,581 B2
(45) Date of Patent: May 21, 2013

(54) METHOD AND APPARATUS FOR PRODUCING OPTICAL FIBER

(75) Inventors: Naruki Koshimizu, Kanagawa (JP); Yuji Abe, Kanagawa (JP); Toshimi Habasaki, Kanagawa (JP); Tetsuya Hayashi, Kanagawa (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 73 days.

(21) Appl. No.: 13/125,014

(22) PCT Filed: Oct. 19, 2009

(86) PCT No.: PCT/JP2009/067980
§ 371 (c)(1),
(2), (4) Date: Apr. 19, 2011

(87) PCT Pub. No.: WO2010/047294
PCT Pub. Date: Apr. 29, 2010

(65) Prior Publication Data
US 2011/0198766 A1    Aug. 18, 2011

(30) Foreign Application Priority Data

Oct. 20, 2008  (JP) ................................ 2008-269915
Oct. 13, 2009  (JP) ................................ 2009-236344
Oct. 13, 2009  (JP) ................................ 2009-236357

(51) Int. Cl.
*D02G 3/22* (2006.01)
(52) U.S. Cl.
USPC ......................................................... 57/293

(58) Field of Classification Search
USPC .................................................. 57/204, 293
See application file for complete search history.

(56) References Cited

U.S. PATENT DOCUMENTS

| | | | |
|---|---|---|---|
| 4,597,255 A | | 7/1986 | Hunter et al. |
| 5,418,881 A | * | 5/1995 | Hart et al. .................... 385/123 |
| 5,704,960 A | * | 1/1998 | Evans et al. .................... 65/402 |
| 5,943,466 A | * | 8/1999 | Henderson et al. ........... 385/123 |
| 6,324,872 B1 | * | 12/2001 | Blaszyk et al. ................. 65/504 |
| 6,536,700 B2 | * | 3/2003 | Watson et al. ............. 242/419.7 |
| 6,550,283 B2 | * | 4/2003 | Blaszyk et al. ................. 65/402 |
| 6,791,678 B2 | * | 9/2004 | Huang et al. ................. 356/73.1 |

(Continued)

FOREIGN PATENT DOCUMENTS

| | | |
|---|---|---|
| JP | 3-223135 | 10/1991 |
| JP | 8-295528 | 11/1996 |
| JP | 10-114537 | 5/1998 |

*Primary Examiner* — Shaun R Hurley
(74) *Attorney, Agent, or Firm* — Drinker Biddle & Reath LLP

(57) ABSTRACT

An optical fiber producing method and apparatus for producing an optical fiber in which, in a path where an optical fiber is reeled out from a supply bobbin, taken up by take-up means, and wound by a winding bobbin, twists are alternately imparted to the optical fiber by a twist imparting portion. A zone where a high tension load is allowed to be applied to the optical fiber without affecting winding tension of the winding bobbin is disposed, a twist is imparted in the zone, and, when tension immediately before the twist imparting portion is indicated by T (g), a free path length is indicated by L, a twisting amount is indicated by R (turns/m), and a and b are constants, the tension and free path length by which the twisting amount R approximated by "$R = a \times T \times L^b$" is made "2" or more are set.

8 Claims, 10 Drawing Sheets

U.S. PATENT DOCUMENTS

| | | | |
|---|---|---|---|
| 7,317,855 B2 * | 1/2008 | Chen et al. | 385/123 |
| 8,245,541 B2 * | 8/2012 | Habasaki et al. | 65/402 |
| 2004/0017986 A1 * | 1/2004 | Garner et al. | 385/123 |
| 2004/0112090 A1 * | 6/2004 | Lee et al. | 65/402 |
| 2004/0163418 A1 * | 8/2004 | Mohanty et al. | 65/402 |
| 2004/0184751 A1 * | 9/2004 | Chen et al. | 385/123 |
| 2004/0232571 A1 * | 11/2004 | Tong et al. | 264/1.24 |
| 2006/0133751 A1 | 6/2006 | Chen et al. | |
| 2006/0147166 A1 | 7/2006 | Roba et al. | |
| 2010/0095708 A1 * | 4/2010 | Habasaki et al. | 65/402 |

* cited by examiner

(A) VIEW AS SEEN FROM ABOVE — Related Art (B) VIEW AS SEEN FROM FRONT — Related Art

METHOD AND APPARATUS FOR PRODUCING OPTICAL FIBER

TECHNICAL FIELD

The present invention relates to a method and apparatus for producing an optical fiber which is to be used as a transmission medium for optical communication.

BACKGROUND ART

In production of an optical fiber, it is difficult to form a core portion and a cladding portion in a true circular shape, and in a concentric manner, and such portions are formed into a slightly oval shape or a distorted circular shape. Therefore, the refractive index distribution in a cross-sectional structure of an optical fiber is not uniform. As a result, a difference in group velocity of two orthogonally polarized waves in a section of the optical fiber is caused, and there arises a problem in that the PMD (Polarization-Mode Dispersion) is generated. As a method of reducing the PMD, a technique is known in which twists in alternate directions are imparted to an optical fiber.

As a method of imparting a twist to an optical fiber, for example, Patent Reference 1 discloses a method in which a swing guide roller is used. FIG. 11 is a view schematically illustrating the twist imparting method disclosed by Patent Reference 1 above, FIG. 11(A) is a schematic view of the whole method, and FIG. 11(B) is a view illustrating the swing guide roller. As shown in FIG. 11(A), an optical fiber preform 1 which is set in a drawing furnace 2a is heated and softened by a heater 2b, and a glass optical fiber 3 (hereinafter, referred to simply as optical fiber) is drawn. The outer diameter of the drawn optical fiber 3 is measured by an outer diameter measurement unit 4, and fed back to a drawing control unit 5 to control the heating temperature of the heater 2b and the drawing velocity so as to obtain a predetermined outer diameter (usually, 125 μm).

The drawn optical fiber 3 is coated with a coating resin by first and second resin coating dies 6a, 6b, and the resin is cured by first and second ultraviolet irradiation units 7a, 7b. Then, the coated optical fiber 3' which is coated with the resin is wound around a bobbin 8d through a rod roller 8a, a swing guide roller 9, stationary guide rollers 8b, 8c, and the like.

As shown in FIG. 11(B), when the rotation axis y of the swing guide roller 9 is swung by +θ about the drawing direction axis z, a lateral force is applied to the coated optical fiber 3' by the swinging operation, and the coated optical fiber 3' rolls along the surface of the swing guide roller 9. This rolling causes a twist to be imparted to the coated optical fiber 3'. When the swing guide roller 9 is then swung in the opposite direction by −θ, the coated optical fiber 3' rolls in the opposite direction along the surface of the swing guide roller 9. When the swinging from +θ to −θ is repeatedly applied to the swing guide roller 9 as described above, a clockwise twist and a counterclockwise twist with respect to the traveling direction of the coated optical fiber 3' are alternately imparted.

Additionally, various methods such as a method in which, as shown in FIG. 12, a twist is imparted to the optical fiber 3' while the optical fiber is interposed between paired rollers 9a, 9b may be employed.

Patent Reference 2 discloses the swing period and size of a swing guide roller, and also a technique in which the twist imparting to an optical fiber is performed off-line (rewinding and the like) in addition to that in which the spin imparting is performed online during the drawing operation.

PRIOR ART REFERENCE

Patent Reference

Patent Reference 1: JP-A-8-295528
Patent Reference 2: U.S. Patent Publication No. 2006/133751

SUMMARY OF THE INVENTION

Problems that the Invention is to Solve

Usually, the spin imparting to an optical fiber is performed during drawing of the optical fiber, and a spint is imparted to a heated and molten portion of a glass fiber in a manner that the portion is permanently deformed. As disclosed in Patent Reference 2, moreover, also an operation of imparting a twist is performed when an optical fiber is to be colored or rewound after the optical fiber in a state where a protective coating is applied to the optical fiber is once wound around a reel. In the latter case i.e., the case where a twist is imparted during rewinding of an optical fiber, a swing guide roller is usually placed between a capstan which is take-up means for the optical fiber and a winding bobbin. This is because, after a twist is imparted to the optical fiber, the degree of release of the twist is reduced by winding the optical fiber around the winding bobbin in a relatively early stage.

On the other hand, the PMD of an optical fiber is related to the twisting amount (turns/m) of the optical fiber. As the number of twists is larger, the PMD can be further reduced. The twisting amount of the optical fiber is related to the tension when the optical fiber is in contact with the swing guide roller. As the tension is larger, the twisting amount can be made larger. In the case where the same tension is applied, as the free path length is longer, the twisting amount can be made larger. Because of installation restrictions, however, it is difficult to obtain a sufficient free path length. Moreover, the tension of winding by the winding bobbin must be set to be relatively low (usually, 60 g or less) in order to maintain fiber characteristics such as prevention of an increase of loss. Therefore, the twisting amount (turns/m) due to the swing guide roller which is placed on the winding side is relatively small, and hence there arises a problem in that a sufficient reduction of the PMD cannot be realized.

The invention has been conducted in view of the above-described circumstances. It is an object of the invention to provide an optical fiber producing method and apparatus in which, even in the case where it is difficult to obtain a sufficient free path length because of installation restrictions, sufficient pulling tension is applied to an optical fiber to enhance the twisting efficiency without affecting winding tension of a winding bobbin, whereby the PMD of the optical fiber can be reduced.

A method of producing an optical fiber according to the invention is a method of producing an optical fiber in which, in a path where an optical fiber is reeled out from a supply bobbin, taken up by take-up means, and wound by a winding bobbin, twists are alternately imparted to the optical fiber by a twist imparting portion, wherein a zone where a high tension load is allowed to be applied to the optical fiber without affecting winding tension of the winding bobbin is disposed, a twist is imparted in the zone, and, when tension immediately before the twist imparting portion is indicated by T (g), a free path length is indicated by L, a twisting amount is indicated by R (turns/m), and a and b are constants, the tension and free path length by which the twisting amount R approximated by "$R = a \times T \times L^b$" is made "2" or more are set. It is preferable that the twisting amount R (turns/m) is "4" or more.

The twist imparting by the twist imparting portion is performed in a front stage of the take-up means, or the high-tension loading means and tension buffering means are disposed in a rear stage of the take-up means, and the twist imparting by the twist imparting portion is performed in a place where high tension is set by the high-tension loading means.

Further, one or more twist non-suppression rollers may be placed between the twist imparting portion and a twist suppression roller which is disposed on an upstream side of the twist imparting portion, and which suppresses twisting and swinging of the optical fiber, thereby extending the free path length, When two or more twist non-suppression rollers are used, rotation directions of the twist non-suppression rollers as viewed from a front of an apparatus are identical to each other.

Furthermore, it is preferable that the twist imparting portion is configured by a swing guide roller, and a contact angle β of the optical fiber with respect to a roller surface of the swing guide roller is 40° to 160°.

Effects of the Invention

According to the invention, a zone where a high tension load can be applied on an optical fiber without affecting winding tension of the winding bobbin is disposed. Even in the case where the free path length cannot be increased because of installation restrictions such as space at the facility, therefore, the tension in the zone can be set to be a predetermined value, and a twist can be imparted to the optical fiber while applying relatively high tension to the optical fiber. As a result, the winding tension of the winding bobbin can be set to a value which is approximately equal to a usually used one, and the optical fiber can be efficiently provided with the number of twists per unit length, so that the PMD can be reduced.

MODE FOR CARRYING OUT THE INVENTION

Figure 1:
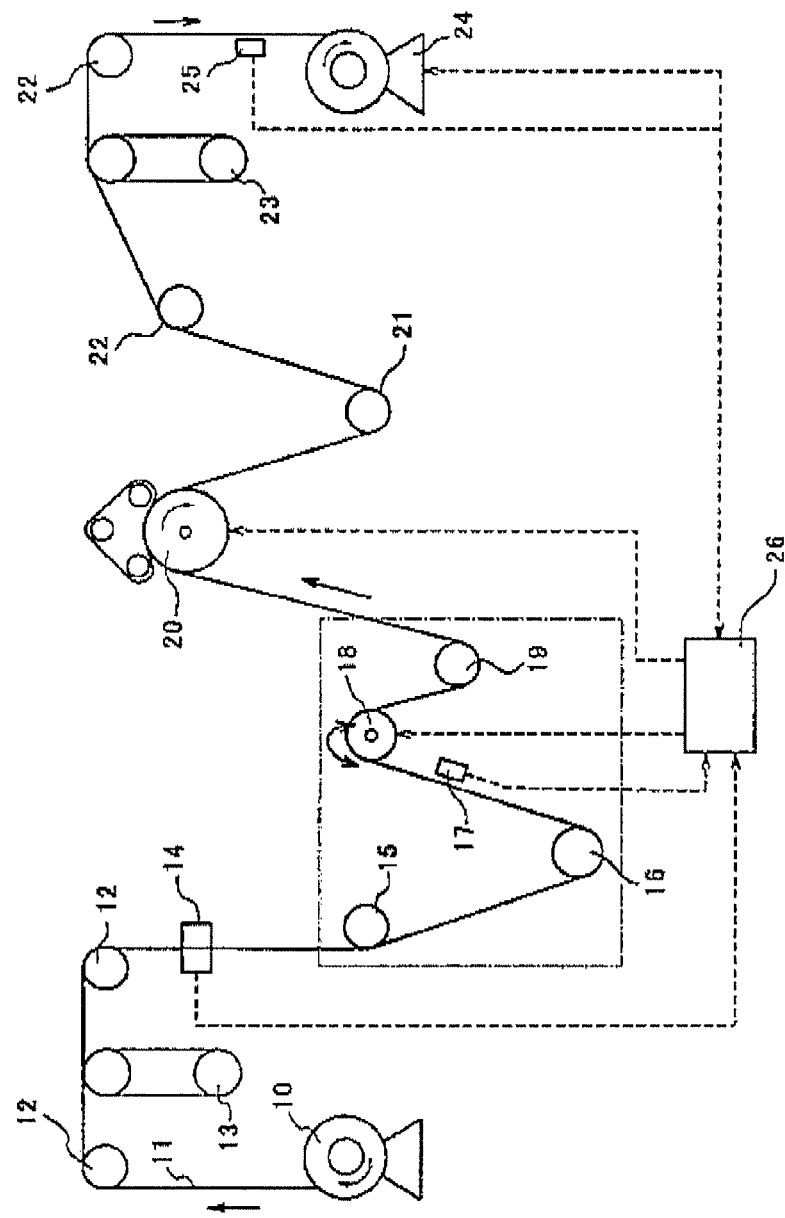
FIG. 1 is a view describing an embodiment of the invention.
Figure 2:
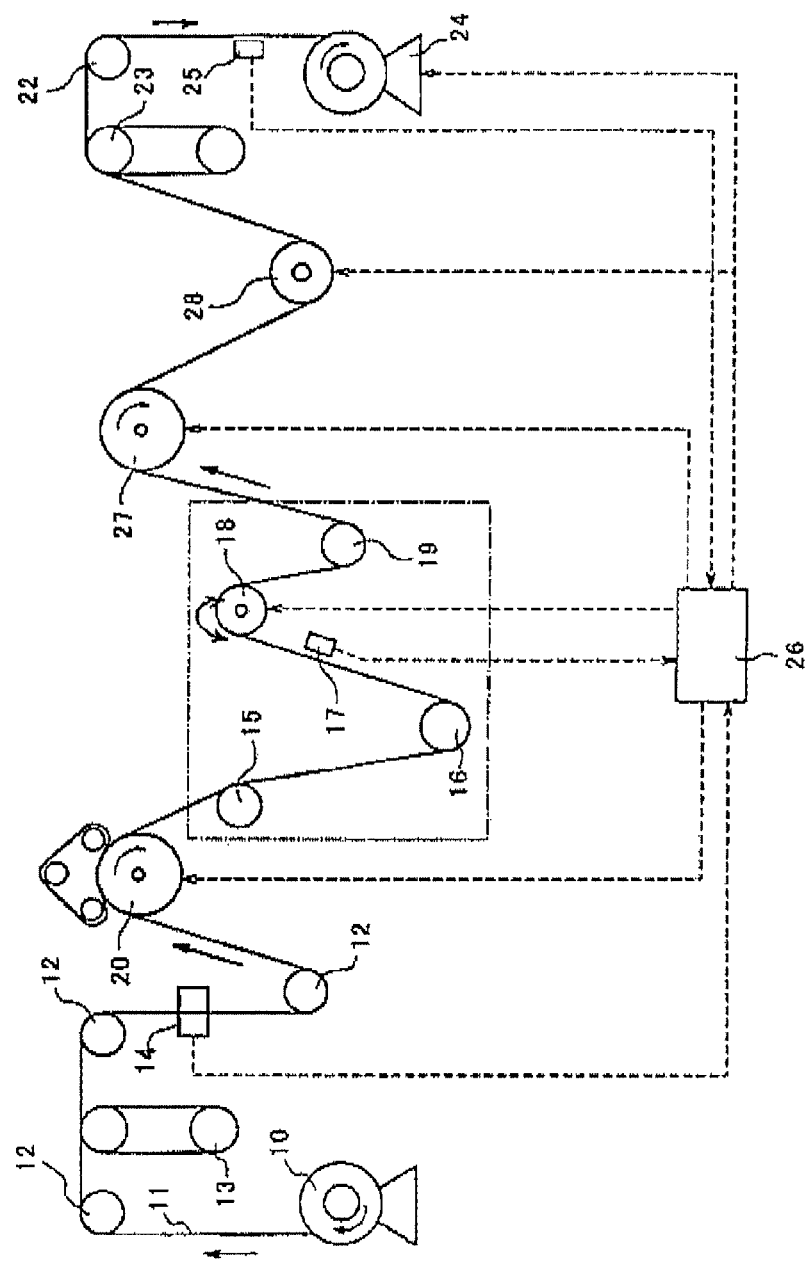
FIG. 2 is a view describing further embodiment of the invention.
Figure 3:
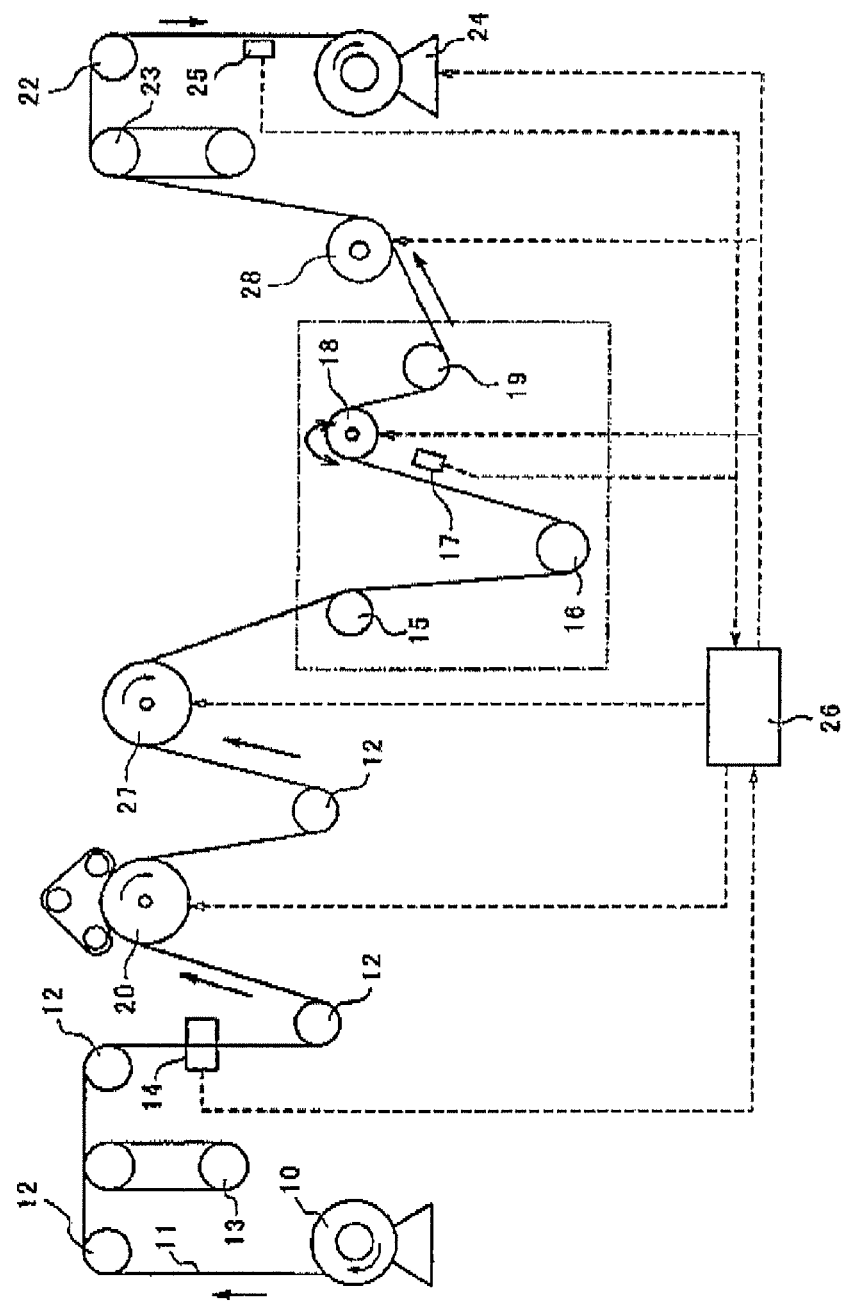
FIG. 3 is a view describing still further embodiment of the invention.

An embodiment of the invention will be described with reference to the figures. FIG. 1 is a view showing an example in which, during a process of rewinding an optical fiber, a twist is imparted to the optical fiber in the front stage of take-up means (a capstan), and FIGS. 2 and 3 are views of examples in which a twist is imparted to an optical fiber in the rear stage of the take-up means. In FIGS. 1 to 3, 10 denotes a supply bobbin, 11 denotes an optical fiber, 12 denotes a guide roller, 13 denotes a dancer roller, 14 denotes a lump detector, 15 denotes a twist suppression roller, 16 denotes a twist non-suppression roller, 17 denotes a tension detector, 18 denotes a twist imparting portion (twist imparting roller), 19 denotes a twist suppression roller, 20 denotes a capstan, 21 and 22 denote guide rollers, 23 denotes a dancer roller, 24 denotes a winding bobbin, 25 denotes a tension detector, 26 denotes a controlling apparatus, 27 denotes high-tension loading means, and 28 denotes a tension helper roller.

In the optical fiber rewinding shown in FIG. 1, the optical fiber 11 which is supplied from the supply bobbin 10 is reeled out at predetermined tension by the guide roller 12 and the dancer roller 13. In the reeled-out optical fiber 11, for example, the presence of lumps can be detected by the lump detector 14 which is placed in the traveling path. The tension during traveling of the optical fiber 11 immediately before the twist imparting portion 18 can be detected by the tension detector 17.

Figure 11:
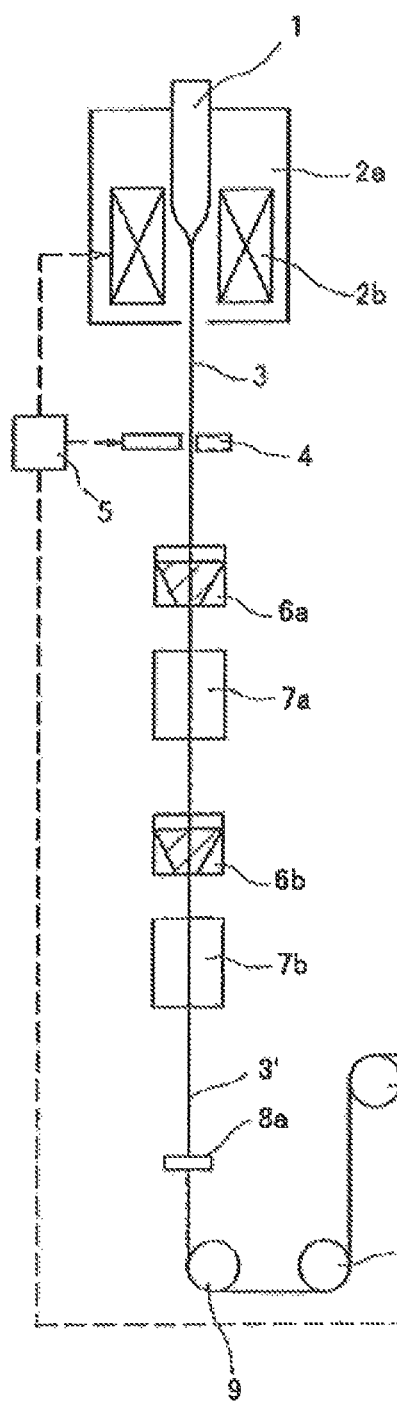
FIG. 11 is a view describing the prior art.
Figure 11:
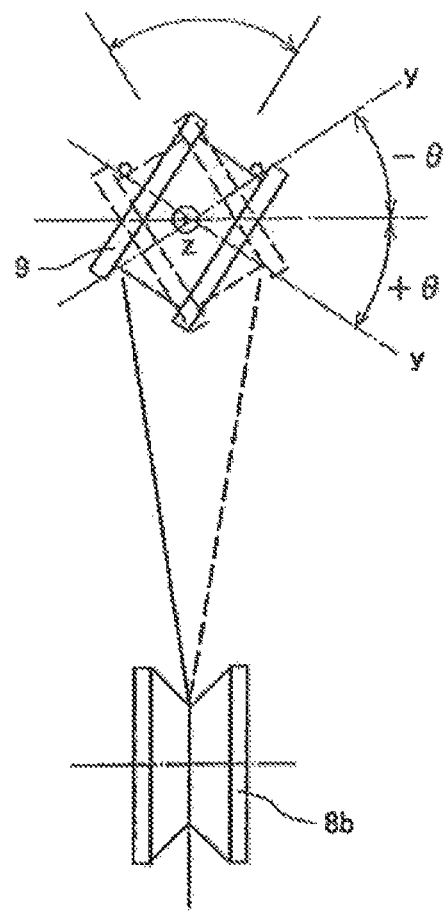

The optical fiber 11 is taken up by the take-up means such as the capstan 20, through the twist suppression roller 15, the twist non-suppression roller 16, and the like, and via the twist imparting portion (hereinafter, referred to as the twist imparting roller) 18 which imparts a twist to the optical fiber 11, and the twist suppression roller 19. As the twist imparting roller 18, for example, the swing guide roller 9 which has been described with reference to FIG. 11(B) may be used, and, also as the twist suppression rollers 15, 19, the V-groove type stationary guide roller 8b such as shown in FIG. 11(B) may be used. As the twist non-suppression roller 16, a roller which has a large roller width, and in which the optical fiber smoothly rolls is used.

The optical fiber 11 which is taken up by the capstan 20 is wound around the winding bobbin 24 through the guide rollers 21 and 22 and the dancer roller 23. As required, the tension of the optical fiber during the winding process is detected by the tension detector 25. The winding speed and the like of the winding bobbin 24 are controlled by the controlling apparatus 26. In addition, the controlling apparatus 26 performs the stop/reverse control due to a detection of a lump of the optical fiber, or the breakage control, the tension control according to the tension detection by the tension detector 17, and controls of the swing period of the twist imparting roller 18, and the like.

The optical fiber rewinding shown in FIG. 2 is an example in which a zone where high tension is applied is disposed in the rear stage of the take-up means. The optical fiber 11 which is supplied from the supply bobbin 10 is reeled out at predetermined tension by the guide roller 12 and the dancer roller 13. The reeled-out optical fiber 11 is taken up by the take-up means such as the capstan 20 while the presence of lumps is detected by the lump detector 14 which is placed, for example, in the traveling path.

In a zone extending from the capstan 20 to the high-tension loading means 27 which is disposed in the rear stage of the capstan 20, high tension is applied to the optical fiber 11 which is taken up by the capstan 20, by the high-tension loading means 27. As the high-tension loading means 27, a configuration in which a capstan same as described above is used and pulling tension is applied between the two capstans may be employed, or that in which predetermined pulling tension is applied to the optical fiber by using an active motor or the like may be employed. In the zone where the high tension is loaded, in a similar manner as described with reference to FIG. 1, the optical fiber 11 is passed through the twist suppression roller 15, the twist non-suppression roller 16, and the like, and a twist is imparted to the optical fiber by the twist imparting roller 18 which imparts a twist to the optical fiber 11, and the twist suppression roller 19. The tension in the traveling process of the optical fiber 11 which is immediately before the twist imparting roller 18 can be detected by the tension detector 17.

After the tension is relaxed by the tension helper roller 28 which is disposed in the rear stage of the high-tension loading means 27, the optical fiber to which the twist is imparted is wound around the winding bobbin 24 through the dancer roller 23 and the guide roller 22. In the case where the high-tension loading means 27 itself can relax the tension of the rear stage, the tension helper roller 28 may be omitted. However, the disposition of the tension helper roller 28 can eliminate influence on the winding tension in a larger degree.

As required, the tension of the optical fiber during the winding process is detected by the tension detector 25. The winding speed and the like of the winding bobbin 24 are controlled by the controlling apparatus 26. In addition, the controlling apparatus 26 performs the stop/reverse control due to a detection of a lump of the optical fiber, or a breakage detection, the tension control according to the tension detection by the tension detector 17, setting and adjustment of the fiber tension by the high-tension loading means 27, and controls of the swing period of the twist imparting roller 18, and the like.

The optical fiber rewinding shown in FIG. 3 is an example in which tension loaded in a zone between the high-tension loading means and the tension helper roller is used. The tension helper roller 28 relaxes the high tension applied by the high-tension loading means 27. Immediately after the high-tension loading means 27, however, high tension of a certain degree remains. In the case where predetermined high tension is obtained between the high-tension loading means 27 and the tension helper roller 28, a twist can be imparted to the optical fiber in a similar manner as the above-described case of FIG. 2.

In the optical fiber rewinding, a screening test is often performed by applying high tension by the high-tension loading means 27. In the configuration where the high-tension loading portion and the twist imparting portion are separately formed as described above, a twist can be imparted without affecting a screening portion.

In a similar manner as described with reference to FIG. 2, the optical fiber 11 which is supplied from the supply bobbin 10 is reeled out at predetermined tension by the guide roller 12 and the dancer roller 13. The reeled-out optical fiber 11 is taken up by the capstan 20 while the presence of lumps is detected by the lump detector 14 which is placed, for example, in the traveling path.

The optical fiber 11 which is taken up by the capstan 20 is passed through the guide roller 12, and predetermined tension is applied to the optical fiber by the high-tension loading means 27. In a similar manner as described with reference to FIG. 2, the optical fiber 11 which has been passed through the high-tension loading means 27 is passed through the twist suppression roller 15, the twist non-suppression roller 16, and the like, and a twist is imparted to the optical fiber by the twist imparting roller 18 which imparts a twist to the optical fiber 11, and the twist suppression roller 19. After the tension is relaxed by the tension helper roller 28, the optical fiber to which the twist is imparted is wound around the winding bobbin 24 through the dancer roller 23 and the guide roller 22.

Figure 4:
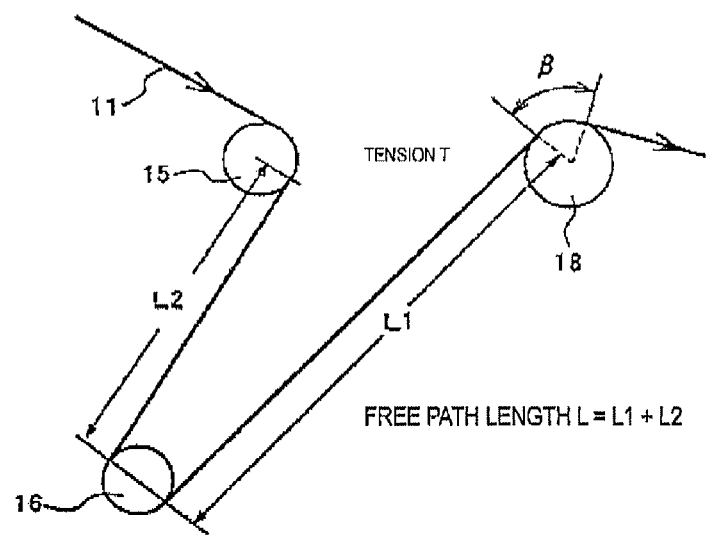
FIG. 4 is a view describing an example of a path line of an optical fiber twist imparting portion.

FIG. 4 is a view schematically showing a path line of an optical fiber twist imparting portion, The twist of the optical fiber is imparted by the twist imparting roller 18, between the twist imparting roller 18 and the twist suppression roller 15 which is placed on the upstream side, or in the path line where the twist non-suppression roller 16 is placed between the twist imparting roller 18 and the twist suppression roller 15. The distance L1+L2 between the twist imparting roller 18 and the twist suppression roller 15, or, in the case where the twist non-suppression roller 16 is omitted, the distance L1 is called the free path length L.

Figure 8:
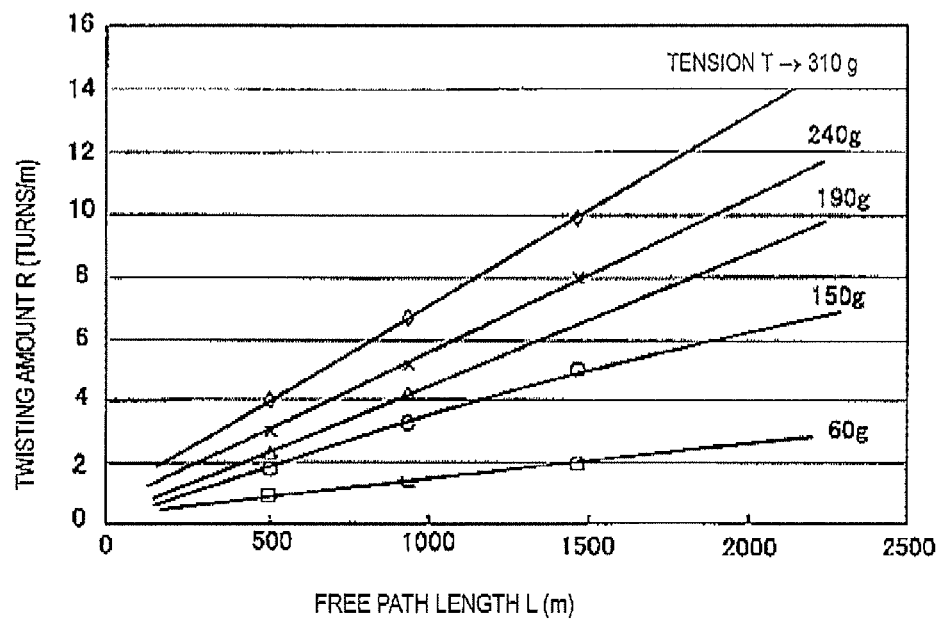
FIG. 8 is a view showing relationships between the free path length and the twisting amount.

In the relationship between the free path length L and the twisting amount (turns/m) indicating the twist number per unit length that can be imparted to the optical fiber, as shown in FIG. 8 which will be described later, a larger number of twists can be formed in the optical fiber as the free path length L is longer.

When the free path length L cannot be sufficiently ensured because of the installation space, the path is folded back by using the twist non-suppression roller 16 as shown in FIG. 4 or the like, the distance L2 between the twist non-suppression roller 16 and the twist suppression roller 15 can be added as the folded back distance, so that "L1+L2" can attain a predetermined free path length.

Figure 12:
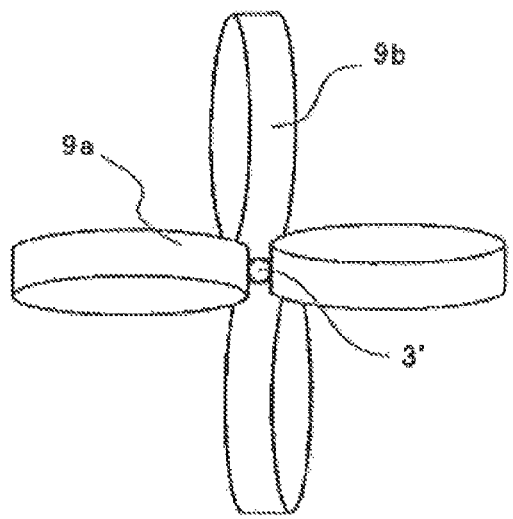
FIG. 12 is a view describing further prior art.
Figure 12:
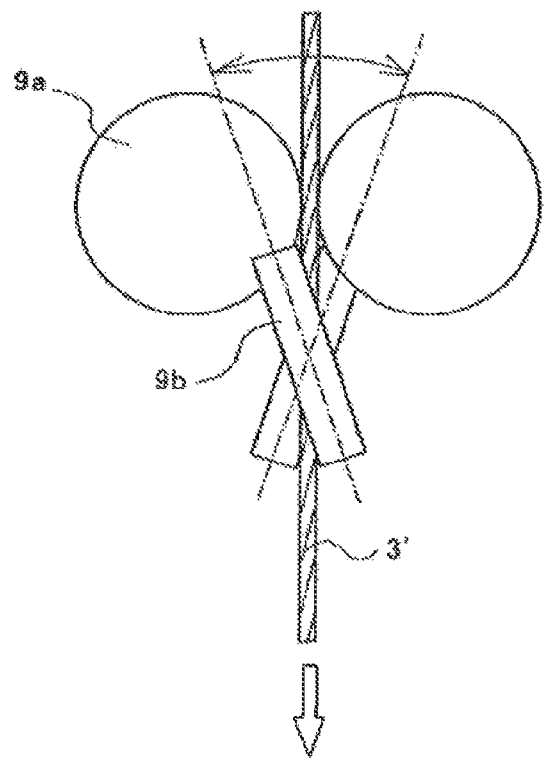

The twist imparting roller 18 is used for applying a twist to the optical fiber by swinging the roller rotation axis by the predetermined swing angle (±θ). As the twist imparting roller, for example, a roller having a shape (swing guide roller) similar to as described with reference to FIGS. 11(B) and 12 can be used, However, the swinging method is not particularly limited. When the twist imparting roller 18 is swung in one direction (+θ direction), a lateral force is applied to the optical fiber, and the optical fiber roils along the surface of the twist imparting roller 18, whereby a twist in the one direction is imparted to the optical fiber 11. When the twist imparting roller 18 is then swung in the opposite direction (−θ direction), the optical fiber rolls along the surface of the twist imparting roller 18 in the opposite direction, whereby a twist in the opposite direction is imparted. As described above, when the twist imparting roller 18 is controlled so as to be repeatedly swung in a swing angle and period in a predetermined range, a clockwise twist and a counterclockwise twist with respect to the traveling direction of the optical fiber 11 can be alternately imparted.

Moreover, the twist imparting to the optical fiber 11 by swinging the twist imparting roller 18 is affected by the contact angle β (also referred to as the winding angle) by which the optical fiber 11 and the twist imparting roller 18 are contacted with each other, as described later. When the contact angle is excessively small, namely, the optical fiber insufficiently rolls along the roller surface, and the predetermined twisting amount cannot be obtained. When the contact angle is excessively large, the resistance in the rolling of the optical fiber along the roller surface is large, so that the rolling is hardly conducted. Therefore, the contact angle β must have an adequate value.

Figure 5:
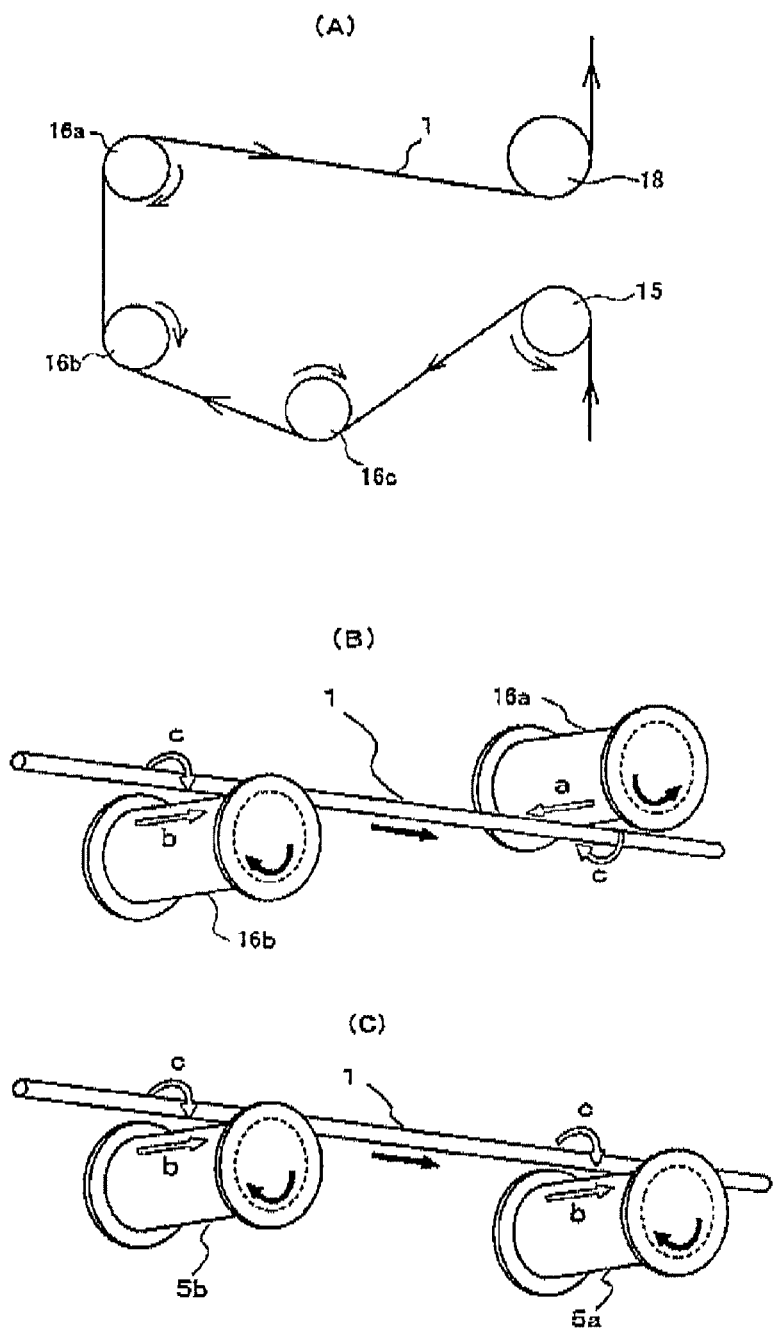
FIG. 5 is a view describing another example of a path line of an optical fiber twist imparting portion.

FIG. 5 is a view showing another example of the path line of the optical fiber twist imparting portion. In the example, as shown in FIG. 5(A), a plurality of fold backs are formed by using two or more twist non-suppression rollers between the twist imparting roller 18 and the twist suppression roller 15. In this case, a plurality of fold backs can be formed, the free path length can be further prolonged as compared with the case of FIG. 4 where one fold back is formed by using one twist non-suppression roller. Therefore, the twisting amount imparted on the optical fiber can be increased.

In the case where two or more twist non-suppression rollers are used as shown in FIG. 5(B), for example, it is assumed that an optical fiber 1 travels from the left direction of the figure to the right direction, a twist non-suppression roller 16a is placed so as to be counterclockwise swung with respect to the travel of the optical fiber as viewed from the front of the apparatus, and a twist non-suppression roller 16b is placed so as to be clockwise swung. Moreover, it is assumed that a twist in the clockwise direction c is imparted on the optical fiber 1 about the axis in the direction toward the travelling direction. In this case, the optical fiber 1 rolls along the roller surfaces of the twist non-suppression rollers 16a, 16b, and, on the twist non-suppression roller 16a, the optical fiber rolls in the direction of the arrow a. By contrast, on the twist non-suppression roller 16b, the optical fiber rolls in the direction of the arrow b. Along the surfaces of the twist non-suppression rollers 16a and 16b, namely, the optical fiber 1 rolls in the opposite directions, and operates so as to impede the mutual rollings, with the result that the twist imparted by the twist imparting roller 18 is suppressed and the twisting amount is reduced.

By contrast, as shown in FIG. 5C, twist non-suppression rollers 5a and 5b are swung in the same direction (in the figure, the clockwise direction as viewed from the front of the apparatus) with respect to the traveling of the optical fiber 1. In this case, it is assumed that a twist in the clockwise direction c is imparted on the optical fiber 1 about the axis in the direction toward the travelling direction. In both the twist non-suppression rollers 5a and 5b, the optical fiber 1 smoothly rolls along the roller surfaces in the direction of the arrow b. Therefore, the rolling operation which is such as produced in FIG. 5(B) described above, and which suppresses twisting of the optical fiber is not caused, and the twisting amount (turns/m) corresponding to the free path length can be imparted.

As shown in FIG. 5(A), therefore, twist non-suppression rollers 16a to 16c are placed so as to be swung in the same direction with respect to the traveling of the optical fiber 1. As a result, in all of the twist non-suppression rollers 16a to 16c, the optical fiber 1 rolls along the roller surfaces in the same direction. Therefore, the rolling operation which is such as produced in FIG. 5(B) described above, and which suppresses twisting of the optical fiber is not caused, and the twisting amount (turns/m) corresponding to the free path length can be imparted.

Figure 6:
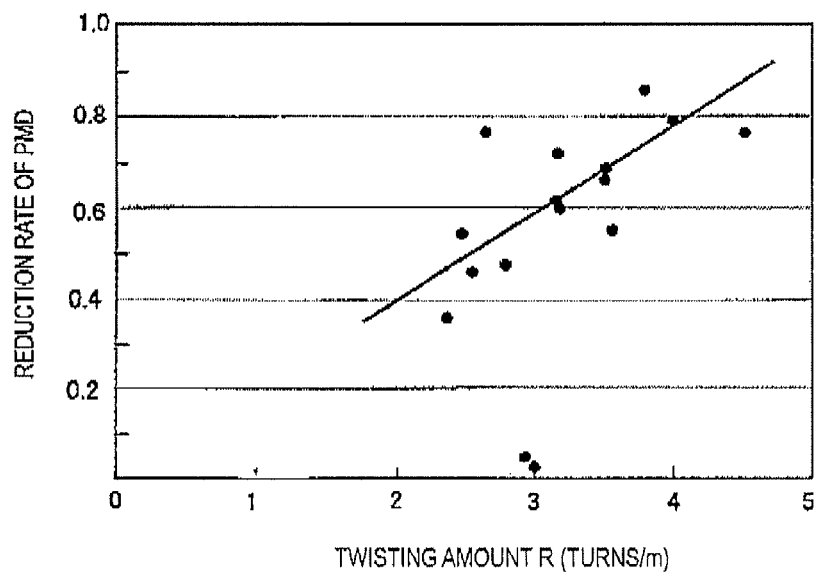
FIG. 6 a view showing relationships between the twisting amount of an optical fiber and the reduction rate of the PMD.

FIG. 6 is a view showing relationships between the twisting amount R (turns/m) of an optical fiber and the reduction rate of the PMD. When the reduction rate of the PMD is defined as "1—(PMD after twist imparting/PMD before twist imparting)", the twisting amount and the reduction rate of the PMD are in substantially proportional relationship as illustrated, and, as the twisting amount are more increased, the reduction rate of the PMD is proportionally increased. When the twisting amount is increased, namely, the PMD is proportionally decreased. In a transmission of 10 to 40 Gbit, it is desirable that the PMD is 0.06 ps/√km or less, preferably 0.02 ps/√km. In view of the ability of a usual present-day general-purpose fiber, i.e., 0.01 to 0.2 ps/√km (the average is 0.1 ps/√km), the target of the reduction rate of the PMD is 0.4, preferably 0.8. In order to attain the target reduction rate of the PMD, the twisting amount R (turns/m) must be ensured to be "2" or more, preferably, "4" or more.

Figure 7:
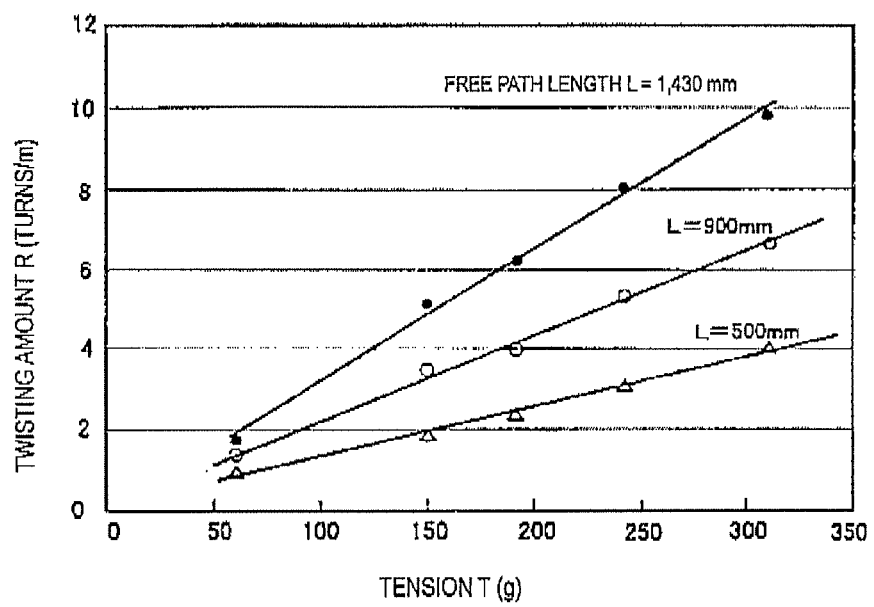
FIG. 7 is a view showing relationships between the tension T of an optical fiber, and the twisting amount.

FIG. 7 is a view showing relationships between the tension T (g) which is applied to an optical fiber, and the twisting amount R (turns/m). In the figure, although other factors are relevant, the twisting amount R (turns/m) of an optical fiber was measured with respect to the tension T (g) which is applied to an optical fiber at a fiber velocity of 750 m/min in the cases where the contact angle β which has been described with reference to FIG. 4 is 71°, the roller diameter is 40 mm, the roller width is 30 mm, the swing angle θ is 15°, the free path length (L1+L2) is 500 mm, 900 mm, and 1,430 mm, respectively. As apparent from the figure, the twisting amount of the optical fiber depends substantially linearly on the tension of the optical fiber.

FIG. 8 is a view showing relationships between the free path length L (mm) which has been described with reference to FIG. 4, and which imparts a twist to an optical fiber, and the twisting amount R (turns/m). In the figure, the twisting amount for each of the free path lengths was measured with respect to the respective free path lengths while making the contact angle β, the roller diameter, the roller width, the swing angle θ, and the fiber velocity constant, and changing the tension T of an optical fiber to 60 g, 150 g, 190 g, 240 g, and 310 g.

Figure 9:
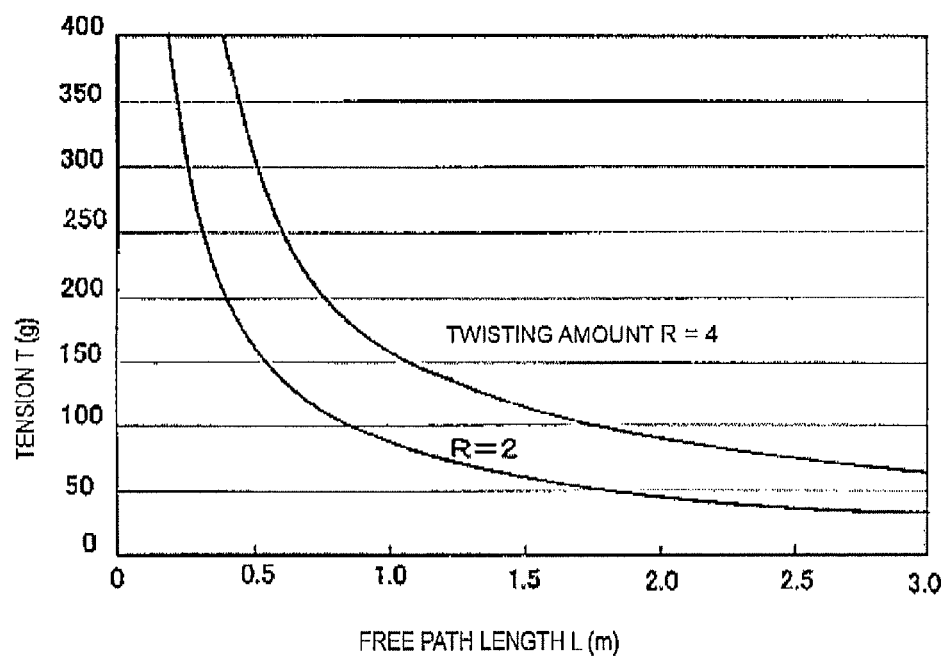
FIG. 9 is a view showing correlative relationships between the free path length and the tension with respect to the twisting amount R of the optical fiber.

FIG. 9 is a view where results are graphed which are obtained by expressing relationships between the tension T (g) and the free path length L (m) as approximate curves wherein a and b are constants so that twisting amounts R (turns/m) are constant at "2" and "4". In the approximate curves, the approximation is performed by the expression of $$R = a \times T \times L^b$$

where a=0.0235 and b=0.90. In the expression, a and b are constants which are changed by factors such as the easiness of twisting due to the surface smoothness of the rollers or the like, and the swing period (velocity). When rollers having an excellent twist performance are used, for example, the value of a is larger.

As apparent from the figure, in order to ensure the twisting amount R (turns/m) to be "2" or more, the tension T and the free path length L are requested to be in the right side of the graph of the twisting amount R=2, and, in order to ensure the twisting amount R (turns/m) to be "4" or more, the tension T and the free path length L are requested to be in the right side of the graph of the twisting amount R=4. More specifically, in the case where the free path length is 1 m, for example, the tension T is required to be 80 g or more in order to ensure the twisting amount R (turns/m) to be "2" or more, and the tension T is required to be 160 g or more in order to ensure the twisting amount R (turns/m) to be "4" or more. In screening of optical fibers, a tension of about 900 g to 1,100 g is sometimes applied. However, the frequency of occurrence of breaks is increased. Therefore, it is preferable to perform screening at a tension of the degree which is equal to smaller than the value (for example, 500 g or less).

As described above, when a tension of 160 g or more is ensured in an optical fiber and swinging is performed, for example, a twisting amount of "4" or more is ensured, and an effect of reducing the PMD is attained. As described above, however, the winding tension must be set to be about 60 g. Therefore, the tension cannot be set to be high in a place where the winding tension of the winding bobbin may be affected. In the winding facility of FIG. 1, even when the tension is set to be high in the front stage of the capstan 20, the winding tension is not affected, and hence the twist imparting roller 18 is placed in the portion so that the required tension of the optical fiber is ensured.

By contrast, in the winding facility of FIG. 2, the high-tension loading means 27 is disposed in the rear stage of the capstan 20 to form a configuration where the tension is relaxed by tension relaxing means such as the tension helper roller 28. According to the configuration, even when the tension is set to be high in the range from the capstan 20 to the high-tension loading means 27, the winding tension is not affected, and, as shown in FIG. 2, the twist imparting roller 18 is placed in the high-tension portion, whereby the required tension of the optical fiber is ensured. Also in FIG. 3, required tension of the optical fiber is ensured in a similar manner as FIGS. 1 and 2.

In the case where the free path length L is 500 mm, when the tension of the optical fiber is 150 g or less, a twisting amount of "2" or more cannot be ensured. By contrast, in the case where it is assumed that the optical fiber is caused to travel at a tension of 100 g or more, in order to ensure a twisting amount of "2" or more, the free path length L must be 800 mm or longer. In the case where the space for the free path length L cannot be sufficiently ensured because of the configuration of the facility, in addition to solution by enhancing the tension of the optical fiber, the twist non-suppression roller 16 may be used as described with reference to FIG. 4 to form a free path length including the folded back distance of L2, whereby a predetermined free path length is ensured. In the case where the free path length is folded back, when two or more twist non-suppression rollers are used, the twist non-suppression rollers are placed so as to be swung in the same direction as shown in FIG. 5, whereby a twisting amount corresponding to the elongated free path length can be imparted.

Figure 10:
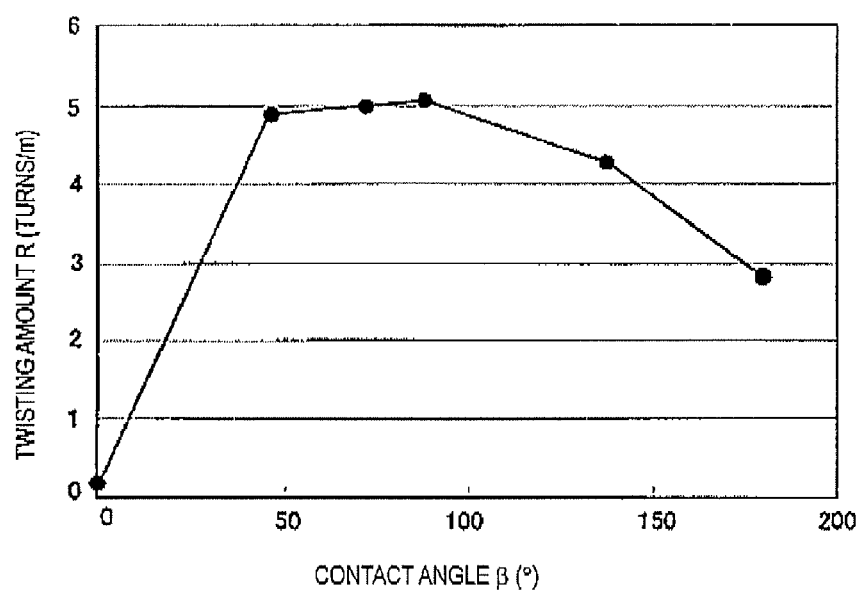
FIG. 10 is a view showing relationships between the contact angle of an optical fiber and the twisting amount.

FIG. 10 is a view showing relationships between the contact angle β (°) of an optical fiber which has been described with reference to FIG. 4, and which is formed with respect to the twist imparting roller, and the twisting amount R (turns/m). In FIG. 10, the twisting amount R was measured by changing the contact angle β while the free path length, the roller diameter, the roller width, and the swing angle were set to be identical with the parameters in the measurement of FIG. 7, the free path length was 1,430 mm, and the tension was 150 g. As a result, when the contact angle β is smaller than 40°, it is difficult to ensure a required twisting amount R (turns/m), and, also when the contact angle β exceeds 160°, it is difficult to ensure a required twisting amount R (turns/m). Therefore, it is desirable that the contact angle β (°) of an optical fiber with respect to the twist imparting roller is set to be equal to or larger than 40° or equal to or smaller than 160°, and more preferably equal to or larger than 50° or equal to or smaller than 100° where the twisting amount R (turns/m) can be ensured to be "5".

As described above, in an off-line step such as rewinding of an optical fiber, in order that the PMD of the optical fiber is reduced by alternately imparting twists to the optical fiber, a predetermined twisting amount (turns/m) is required. It has been found that, in order to impart a predetermined twisting amount (for example, 2 turns/m) or more to an optical fiber, it is necessary to perform a twisting operation while setting the tension and the free path length to be equal to or larger than respective predetermined values. In the invention, even when a sufficient free path length is difficult to be obtained because of installation restrictions, therefore, a twist imparting portion is placed in a place where high tension is enable to be loaded by using tension relaxing means such as a tension helper roller, even in a zone where a high tension load can be applied to an optical fiber without affecting the winding tension of a winding bobbin, for example, in the front stage of take-up means such as a capstan or the rear stage of the take-up means.

According to the configuration, tension which is sufficient for imparting a twist to an optical fiber can be applied even in a place where high tension is allowed to be loaded by using tension relaxing means such as tension helper roller, even in the front stage of take-up means such as a capstan or the rear stage of the take-up means. Even when a sufficient free path length is difficult to be obtained because of installation restrictions, the PMD of the optical fiber can be reduced.

In the case where twisting is performed in front of the take-up means (in front of the capstan), a twist imparted to an optical fiber is released to a certain degree in the path which is extended to the winding by the winding bobbin. A twist may be imparted in consideration of the amount of the releasement. In each case where the twist imparting is performed in the front or rear stage of the capstan, the winding can be performed while the tension of the optical fiber on the side of the winding bobbin is maintained to a tension which is similar to that in the prior art. Moreover, an operation of twisting an optical fiber is eliminated in the vicinity of the winding bobbin. Therefore, fiber vibration is eliminated, and the winding state can be further improved.

DESCRIPTION OF REFERENCE NUMERALS AND SIGNS

10 . . . supply bobbin, 11 . . . optical fiber, 12 . . . guide roller, 13 . . . dancer roller, 14 . . . lump detector, 15 . . . twist suppression roller, 16, 16a to 16c . . . twist non-suppression roller, 17 . . . tension detector, 18 . . . twist imparting portion (twist imparting roller), 19 . . . twist suppression roller, 20 . . . capstan, 21, 22 . . . guide roller, 23 . . . dancer roller, 24 . . . winding bobbin, 25 . . . tension detector, 26 . . . controlling apparatus, 27 . . . high-tension loading means, 28 . . . tension helper roller.

The invention claimed is:

1. A method of producing an optical fiber in which, in a path where an optical fiber is reeled out from a supply bobbin, taken up by take-up means, and wound by a winding bobbin, twists are alternately imparted to the optical fiber by a twist imparting portion, wherein
a zone where a high tension load is allowed to be applied to the optical fiber without affecting winding tension of the winding bobbin is disposed, a twist is imparted in the zone, and, when tension immediately before the twist imparting portion is indicated by T (g), a free path length is indicated by L, a twisting amount is indicated by R (turns/m), and a and b are constants, the tension and free path length by which the twisting amount approximated by "$R = a \times T \times L^b$" is made "2" or more are set.

2. A method of producing an optical fiber according to claim 1, wherein the twisting amount R (turns/m) is "4" or more.

3. A method of producing an optical fiber according to claim 1, wherein the twist imparting by the twist imparting portion is performed in a front stage of the take-up means.

4. A method of producing an optical fiber according to claim 1, wherein high-tension loading means and tension buffering means are disposed in a rear stage of the take-up means, and the twist imparting by the twist imparting portion is performed in a place where high tension is set by the high-tension loading means.

5. A method of producing an optical fiber according to claim 1, wherein
one or more twist non-suppression rollers are placed between the twist imparting portion and a twist suppression roller which is disposed on an upstream side of the twist imparting portion, and which suppresses twisting and swinging of the optical fiber, thereby extending the free path length.

6. A method of producing an optical fiber according to claim 5, wherein two or more twist non-suppression rollers are included, and rotation directions of the twist non-suppression rollers as viewed from a front of an apparatus are identical to each other.

7. A method of producing an optical fiber according to claim 1, wherein the twist imparting portion is configured by a swing guide roller, and a contact angle β of the optical fiber with respect to a roller surface of the swing guide roller is 40° to 160°.

8. An apparatus for producing an optical fiber in which, in a path where an optical fiber is reeled out from a supply bobbin, taken up by take-up means, and wound by a winding bobbin, twists are alternately imparted to the optical fiber by a twist imparting portion, wherein a zone where a high tension load is allowed to be applied to the optical fiber without affecting winding tension of the winding bobbin is disposed, a twist is imparted in the zone, and, when tension immediately before the twist imparting portion is indicated by T (g), a free path length is indicated by L, a twisting amount is indicated by R (turns/m), and a and b are constants, the tension and free path length by which the twisting amount R approximated by "$R = a \times T \times L^b$" is made "2" or more are set.

* * * * *